(12) United States Patent
Chen

(10) Patent No.: US 9,791,699 B2
(45) Date of Patent: Oct. 17, 2017

(54) OPTICAL POSITIONING AIMING SYSTEM

(71) Applicant: Advanced Eye Protection IP Holding, Park City, UT (US)

(72) Inventor: Stephen Charles Chen, Park City, UT (US)

(73) Assignee: Advanced Eye Protection IP Holding, Park City, UT (US)

( * ) Notice: Subject to any disclaimer, the term of this patent is extended or adjusted under 35 U.S.C. 154(b) by 650 days.

(21) Appl. No.: 14/209,680

(22) Filed: Mar. 13, 2014

(65) Prior Publication Data
US 2016/0290764 A1 Oct. 6, 2016

Related U.S. Application Data

(60) Provisional application No. 61/780,684, filed on Mar. 13, 2013.

(51) Int. Cl.
| | |
|---|---|
| *G02B 27/14* | (2006.01) |
| *G03H 1/00* | (2006.01) |
| *G03B 21/56* | (2006.01) |
| *G02B 27/10* | (2006.01) |
| *G09G 5/00* | (2006.01) |

(Continued)

(52) U.S. Cl.
CPC .......... *G02B 27/0172* (2013.01); *F41A 17/08* (2013.01); *F41G 3/02* (2013.01); *F41G 3/04* (2013.01); *F41G 3/165* (2013.01); *F41G 3/225* (2013.01); *F41G 9/00* (2013.01); *H04N 5/2256* (2013.01); *H04N 5/23206* (2013.01); *H04N 5/272* (2013.01); *H04N 5/33* (2013.01); *H04N 5/332* (2013.01); *G02B 2027/0138* (2013.01);

(Continued)

(58) Field of Classification Search
CPC .. G02B 27/0172; G02B 27/01; G02B 27/017; G02B 27/145; G02B 3/0056; G02B 27/0149; G02B 27/0103; G03B 21/56; G03B 21/625; G03B 21/602
USPC ... 359/13–14, 727, 618–619, 625, 629, 639, 359/443, 626, 621, 454–455, 630–634; 345/7–9
See application file for complete search history.

(56) References Cited

U.S. PATENT DOCUMENTS 4,786,966 A * 11/1988 Hanson .................... F41G 3/165
224/181
2003/0147651 A1* 8/2003 Roes ..................... F41G 3/2655
398/108

(Continued)

*Primary Examiner* — Dawayne A Pinkney
(74) *Attorney, Agent, or Firm* — Maschoff Brennan

(57) ABSTRACT

An optical positioning aiming system including an optical positioning subsystem (subsystem). The subsystem is configured to determine relative positions of a weapon and a head mounted display. The subsystem includes a processing unit, infrared (IR) emitters mounted to a weapon, IR emitters mounted to the head mounted display, IR cameras mounted to the weapon, and IR cameras mounted to the head mounted display. The IR cameras mounted to the weapon are configured to determine a relative position of the IR emitters mounted on the head mounted display and to communicate the relative position of the IR emitters mounted on the head mounted display to the processing unit. The IR cameras mounted to the head mounted display are configured to determine a relative position of the IR emitters mounted to the weapon and communicate the relative position of the IR emitters mounted to the weapon to the processing unit.

10 Claims, 13 Drawing Sheets

(51) Int. Cl.
*G02B 27/01* (2006.01)
*H04N 5/33* (2006.01)
*H04N 5/272* (2006.01)
*H04N 5/225* (2006.01)
*H04N 5/232* (2006.01)
*F41A 17/08* (2006.01)
*F41G 3/02* (2006.01)
*F41G 3/04* (2006.01)
*F41G 3/16* (2006.01)
*F41G 3/22* (2006.01)
*F41G 9/00* (2006.01)

(52) U.S. Cl.
CPC ............... *G02B 2027/0174* (2013.01); *G02B 2027/0187* (2013.01)

(56) References Cited

U.S. PATENT DOCUMENTS

2010/0196859 A1* 8/2010 Saugen .................. A42B 3/042
　　　　　　　　　　　　　　　　　　　　　434/11
2014/0373424 A1* 12/2014 Silvers ..................... F41G 1/38
　　　　　　　　　　　　　　　　　　　　　42/122

* cited by examiner

OPTICAL POSITIONING AIMING SYSTEM

CROSS REFERENCE TO RELATED PATENT APPLICATIONS

This patent application claims priority to and the benefit of U.S. Provisional Application No. 61/780,684, which is incorporated herein by reference in its entirety.

FIELD

The embodiments discussed herein are related to aiming systems integrated into head protective systems and eyewear systems.

BACKGROUND

Heads up displays (HUDS) and similar visible displays make information available to users. Additionally, some HUDS and similar visible displays have been developed to advance small arms aiming systems and improve combat effectiveness through display of information to the user. However, the existing HUDS that integrate visible data or aiming systems are limited because the existing HUDS compromise field of view of a user. Specifically, the small arms aiming systems introduce an aiming system into a head protective system that covers a large portion of the head and face of the user, which compromises the field of view. Thus, the existing HUDS reduce combat effectiveness of users such as infantry forces. Interference with the field of view presents challenges when performing individual tasks in a field environment and when communicating with another team member. Tasks such as ambulatory movement, navigation, sending and receiving visual and audible signals, and operating equipment are more challenging with reduced sensory perception and awareness while using head protective systems. This results in reduced situational awareness and therefore reduced combat effectiveness.

Small arms aiming systems also present a problem when aiming and operating individual small arms, because additional protective coverings physically interfere with current small arms aiming devices. Some small arms aiming systems display data without interfering with the field of view of the user. However, these systems rely on gyroscopic data that is susceptible to interference due to accelerations or rely on magnetometers with which large metallic objects may interfere.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, an optical positioning aiming system including an optical positioning subsystem (subsystem). The subsystem is configured to determine relative positions of a weapon and a head mounted display. The subsystem includes a processing unit, infrared (IR) emitters mounted to a weapon, IR emitters mounted to the head mounted display, IR cameras mounted to the weapon, and IR cameras mounted to the head mounted display. The IR cameras mounted to the weapon are configured to determine a relative position of the IR emitters mounted on the head mounted display and to communicate the relative position of the IR emitters mounted on the head mounted display to the processing unit. The IR cameras mounted to the head mounted display are configured to determine a relative position of the IR emitters mounted to the weapon and communicate the relative position of the IR emitters mounted to the weapon to the processing unit.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

Some embodiments are described herein with reference to the appended figures. In the figures, like structures will be provided with like reference designations. The figures are diagrammatic and schematic representations of some embodiments, are not limiting, nor are they necessarily drawn to scale.

Figure 1:
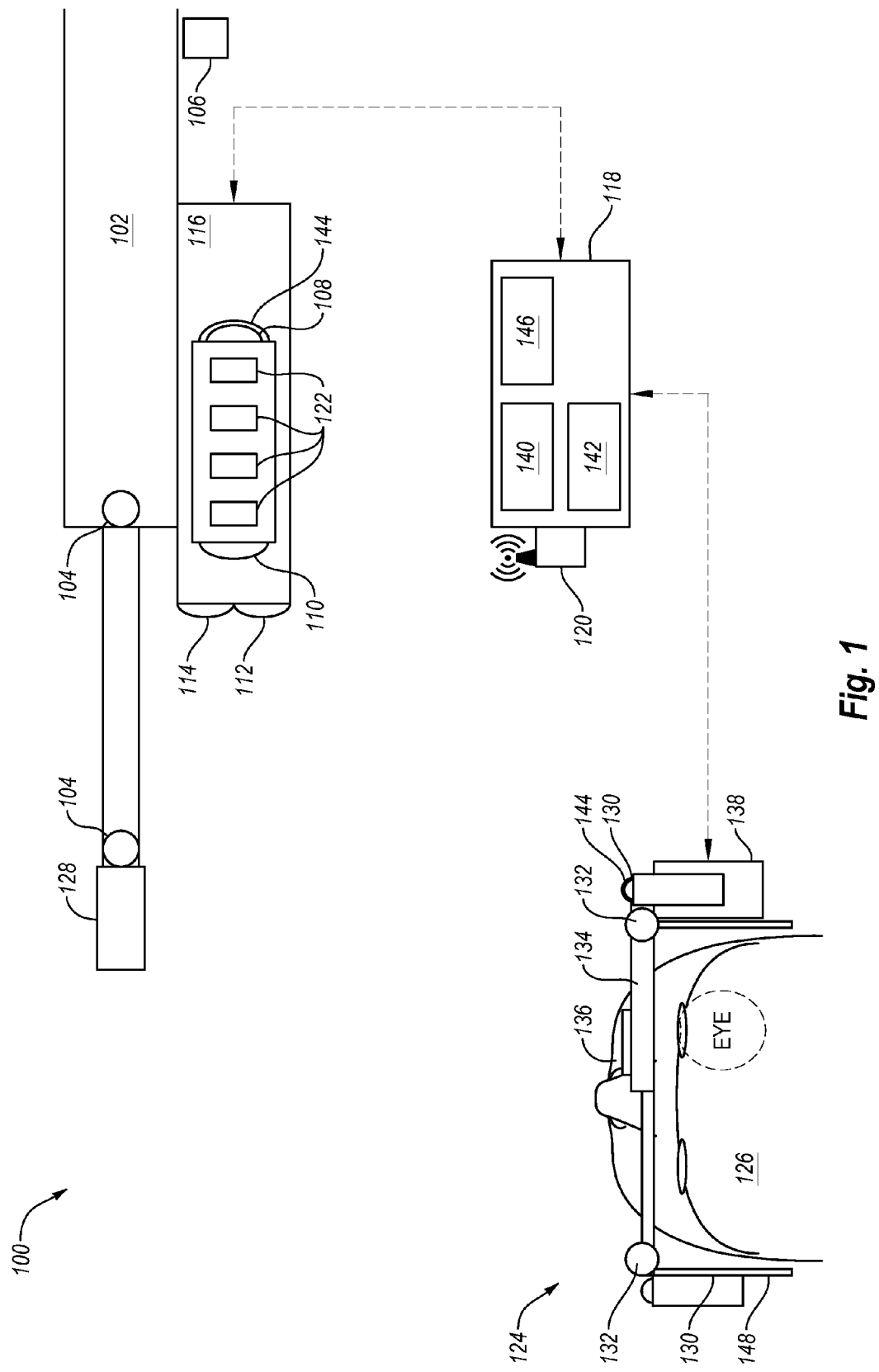
FIG. 1 illustrates an example optical positioning aiming system ("system")

FIG. 1 illustrates an example optical positioning aiming system ("system") 100. The system 100 generally enables a weapon 102 to obtain a relative position with respect to an eyewear/head mounted display ("mounted display") 124. By obtaining the relative position, one or more holographic images may be displayed on the mounted display 124 within the field of view of a user 126.

The system 100 may include the weapon 102, which may include any machine or device configured to discharge ordnance. For instance, the weapon 102 may include a handheld gun, a firearm, a gun, a rifle, etc. The weapon 102 depicted in FIG. 1 is a small arm such as a rifle used in ground military missions, for instance. The weapon 102 includes a bore 128 out of which an ordnance is discharged. Between the bore 128 and a body of the weapon 102 one or more infrared (IR) emitters 104 may be mounted. The IR emitters 104 emit wavelength-specific IR light configured to be detected by one or more IR cameras 130 to determine relative position. The IR light emitted by the IR emitters 104 may be unique for one or more components (e.g., the bore 128) of the system 100, may be unique for the user 126, may be pulsed at a specific frequency or any encrypted specific frequency, may include an encryption signal, or any combination thereof. More particularly, the IR emitters 104 may emit IR signals that are received by one or more IR cameras 130 mounted on the mounted display 124. The placement and/or number of IR emitters 104 are not meant to be limiting.

In some embodiments, the system 100 may identify the particular type of weapon 102 and/or ammunition used therein using a radio frequency identification (RFID) tag. The RFID tag may be affixed to, in-molded to a polymer component of, or otherwise included in the weapon 102. Additionally or alternatively, one or more RFID tags may be in-molded to a polymer component of or otherwise included in a magazine that may hold a particular ammunition. The weapon 102 may include an RFID reader 106 to read the information included in the one or more RFID tags and/or to communicate the information to a processing unit 118. The processing unit 118 may use the information in one or more ballistic calculations.

The weapon 102 may include the processing unit 118, a sensor pack 116, and a user interface (not shown). Generally, the processing unit 118, the sensor pack 116, the user interface, or any combination thereof may be mounted to the weapon 102 or may be a separate system that is integrated physically and communicatively with the system 100. For instance, the sensor pack 116 may be produced separately and attached to the weapon 102. In addition, the processing unit 118 may be produced separately, linked to the weapon 102, and worn in a pack of the user 126. In some embodiments, the processing unit 118 may include housing mounted on a uniform of the user 126, to load-bearing equipment, or may be contained within a housing with the sensor pack 116.

The sensor pack 116 may contain one or more components (e.g., 108, 110, 112, 114, and 122) configured to generate data used by the system 100. The depicted sensor pack 116 includes sensors 122, an IR camera 108, a laser range finder 110, and two forward-facing cameras 112 and 114. In some alternative embodiments, one or more of the sensors 122, the IR camera 108, the laser range finder 110, or two forward-facing cameras 112 and 114 may be omitted or included elsewhere in the system 100.

The sensors 122 may be configured to acquire ballistic data and/or navigation data used in ballistic calculations or otherwise by the user 126. The sensors 122 may include, but are not limited to, a gyroscope/inclinometer, a global positioning system (GPS) module, a temperature sensor, a humidity sensor, a barometric pressure sensor, a digital compass, a digital forward-facing camera, a wind speed sensor, a laser range finder, a processing unit, or any combination thereof. The sensor pack 116 may include one or more housings that include one or more subsets of the sensors 122.

The IR camera 108 may be configured to detect an IR signal emitted from one or more IR emitters 132 located on the mounted display 124. The IR camera 108 may be used for the optical positioning of the mounted display 124 with respect to the weapon 102 or one or more other users. The IR camera 108 may include an IR filter 144 to allow transmission of only specific wavelengths which may avoid interference from unwanted IR light.

The forward-facing cameras 112 and 114 may be configured to sense visible and non-visible light, sense specific wavelengths, generate thermal images, or any combination thereof. The forward-facing cameras 112 and 114 may provide a telescopic pop up picture of a target and/or target image overlays (discussed below). The forward-facing cameras 112 and 114 may also be variable power.

The processing unit 118 may be configured to receive and process data. The data may originate at the weapon 102; the mounted display 124; sensors (e.g., the sensors 122) and instruments included on the weapon 102 and/or the mounted display 124; wireless communications/network links; or any combination thereof. From the data, the processing unit 118 determines the holographic images for the display on the mounted display 124.

In some embodiments, the processing unit 118 includes processing circuitry 140, which may include hardware used for processing the data and determining accurate aiming, positional, ballistic, communications, and imaging.

The hardware may include a processor. The processor may include an arithmetic logic unit (ALU), a microprocessor, a general-purpose controller, or some other processor array to perform one or more operations described herein. The processor generally processes data signals and may include various computing architectures including a complex instruction set computer (CISC) architecture, a reduced instruction set computer (RISC) architecture, or an architecture implementing a combination of instruction sets.

The processing unit 118 may also include processing software 142. The processing software 142 may include computational code to execute the processing data and determine accurate aiming, positional, ballistic, communications, and imaging. In some embodiments, the processing software 142 may be stored at least temporarily in memory. The memory may be a DRAM device, an SRAM device, flash memory, or some other memory device. In some embodiments, the memory also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory may be configured to store instructions and/or data that may be executed by the processing unit 118. The instructions and/or data may include code for performing the techniques or methods described herein. The memory and the processor may be coupled to other components of the processing unit 118 via a bus.

The processing unit 118 may also include communication links 146 that may be initiated and/or maintained by a transceiver 120. The communication links 146 may include any wired or wireless communication links on which data is communicated. Accordingly, the transceiver 120 may include wired and/or wireless capabilities. The communications links 146 may be configured to send and receive locational data, communications, environmental data, and other network information. Inclusion of the communication links 146 through the user of the transceiver 120 may expand available information beyond what is inherent to the user 126.

In some embodiments, the communication links 146 includes a port for direct physical connection to a network or to another communication channel. For example, the communication links 146 may include a USB, SD, CAT-5, or similar port for wired communication. In some embodiments, the communication links 146 include a wireless transceiver for exchanging data via communication channels using one or more wireless communication methods, including IEEE 802.11, IEEE 802.16, BLUETOOTH®, or another suitable wireless communication method.

In some embodiments, the communication links 146 includes a cellular communications transceiver for sending and receiving data over a cellular communications network including via SMS, MMS, hypertext transfer protocol (HTTP), direct data connection, WAP, e-mail, or another suitable type of electronic communication. In some embodiments, the communication links 146 include a wired port and a wireless transceiver. The communication links 146 may also provide other conventional connections for distribution of files and/or media objects using standard network protocols including transmission control protocol/internet protocol (TCP/IP), HTTP, HTTP secure (HTTPS), and simple mail transfer protocol (SMTP), etc.

The user interface may be configured to enable the user 126 to input and select a function of the system 100, to control one or more optional functions of the system 100, to input a desired parameter of the system 100, or any combination thereof. The user interface may include one or more of joysticks, display keys, switches, or nobs, for example. Additionally, the user interface may enable the user 126 to correct a holographic image.

Generally, the sensor pack 116 may communicate data (e.g., navigation and/or ballistic) to the processing unit 118. The processing unit 118 may perform one or more operations using the data and communicate information derived from the data to the sensor pack 116. Additionally, the processing unit 118 may receive data from the mounted display 124. The mounted display 124 may perform one or more calculations using the data from the mounted display 124 and/or combine the data from the mounted display 124 with the data from the sensor pack 116 to perform calculations. Information determined from the calculations may be communicated to the sensor pack 116, the mounted display 124, to an external entity (e.g., another user, a central server, etc.), or some combination thereof.

The mounted display 124 may be configured to project holographic images into the field of view of the user 126. Specifically, in some embodiments, the mounted display 124 includes a near eye display 136 and an image generator 138 which generate and project the holographic images in the field of view of the user 126. The near eye display 136 and the image generator 138 may be incorporated with a transparent or semi-transparent media 134 placed in front of an eye of the user 126. Thus, other than the holographic images projected into the field of view, the user 126 may see through the media 134. For example, the media 134 may include a planar waveguide. In these examples, the holographic image may be collimated until it is positioned in the near eye display 136.

The holographic images may be used to aim the weapon 102 and/or to convey other data. Some components of the mounted display 124 are used for optically positioning the mounted display 124 relative to the weapon 102 and/or other users (discussed elsewhere herein).

By optically positioning the mounted display 124 relative to the weapon and/or the other users, the holographic images projected into the field of view of the user 126 are accurately positioned in relationship to the weapon 102, the bore 128, and objects that exist in the environment of the user 126.

For example, the holographic images may include an aiming reticle superimposed into the field of view of the user 126. The aiming reticle corresponds to the point of impact of the weapon 102. The aiming reticle may be free to move with respect to the weapon movement and/or head movement of the user 126, within the field of view of the user 126. Reticle aiming can be accomplished by utilizing the system 100 to determine the relative position such as orientation of the weapon 102 (i.e., the bore 128 or barrel of the weapon) with reference to the geometry of the mounted display 124. The orientation and relative position may be determined in a three-dimensional space.

The holographic images may also include other information that is superimposed or projected into the field of view of the user 126 to be easily and readily visible. For example, battlefield information such as waypoints, visual communications, and the position of other users, overlays, navigational information, etc.; a pop up telescopic picture in a virtual picture window within the mounted display 124; or thermal image overlays to identify heat sources such as enemy personnel, weapons, equipment, and bullets may be incorporated in the holographic images.

The mounted display 124 may include a frame 148. The frame 148 may be configured to hold one or more other components (e.g., 130, 132, 134, and 136) in a fixed or an essentially fixed position. For example, the fixed position might be a relative position on a head of the user 126 or to a headgear such as helmets, masks, visor, etc.

The mounted display 124 may also include the image generator 138. The image generator 138 may be configured to create the holographic image(s) from data. The data may be received from the processing unit 118, the sensor pack 116, an outside source (not shown), or some combination thereof. Some examples of the image generator 138 may include a micro display, a light-emitting diode (LED) backlight, and/or an image collimator.

The mounted display 124 may also include the near eye display 136. The near eye display 136 may be configured to project or superimpose the holographic image within the field of view of the user 126. The near eye display 136 may project the holographic image by transmitting the holographic image from the image generator 138. A holographic wave-guide is one example of how the transmission of the holographic image to the near eye display 136 may be accomplished. The frame 148 may hold the near eye display 136 in the appropriate location relative to the eye of the user 126.

The mounted display 124 may also include one or more IR cameras 130. The IR cameras 130 may be configured in optically positioning the positions of the IR emitters 104 mounted on the weapon 102 and/or other team members (shown below in FIGS. 6-8) relative to the near eye display 136. The IR cameras 130 may be equipped with the IR filter 144 to allow transmission of one or more specific wavelengths, which may avoid or reduce interference from unwanted IR light.

The mounted display 124 may also include IR emitters 132. The IR emitters 132 may be configured to provide wavelength-specific IR signals (e.g., IR light). The IR signals may be detected by the IR camera 108 on the weapon 102 to determine a position of the weapon 102 relative to the mounted display 124. The IR emitters 132 may emit IR signals having a unique wavelength, which may be used to determine position of one or more components of the mounted display 124, the system 100, specific to the user 126, or some combination thereof.

Although not shown in the embodiment depicted in FIG. 1, the mounted display 124 may include one or more sensors or instruments. For example, the mounted display may include an electronic compass.

In sum, the system 100 uses the IR cameras 108 and 130 with the IR emitters 104 and 132 to optically position the weapon 102 relative to the mounted display 124 and vice versa. The relative position is determined directly with optical methods and thus greatly increases accuracy and reliability of the system 100. Additionally, the system 100 may incorporate ballistic calculations based on portable and networked data from the sensors 122 and/or other external sources, which also increases accuracy and reliability of the system 100.

The system 100 is depicted integrated into the mounted display 124. This is not meant to be limiting. The system 100 may be implemented in a helmet, protective lenses and eyewear, a face and lower mandible guard, a neck guard, hearing protection, audible and voice communications systems, and visible communication systems. For example, an integrated head protective system may include a lens with the system 100.

In some embodiments, the system 100 improves protection for soldiers while increasing combat effectiveness. For example, a combat head protective system including the system 100 may improve overall situational awareness by making critical data easily and readily available in the form of holographic images projected or superimposed into the field of view of the user 126. Additionally, the system 100 provides the ability to aim the weapon 102 with a generous field of view while being aware of critical battlefield data. The visual display allows the user 126 and/or a team of users to multitask in a combat environment and, thus, increases combat effectiveness.

Figure 2:
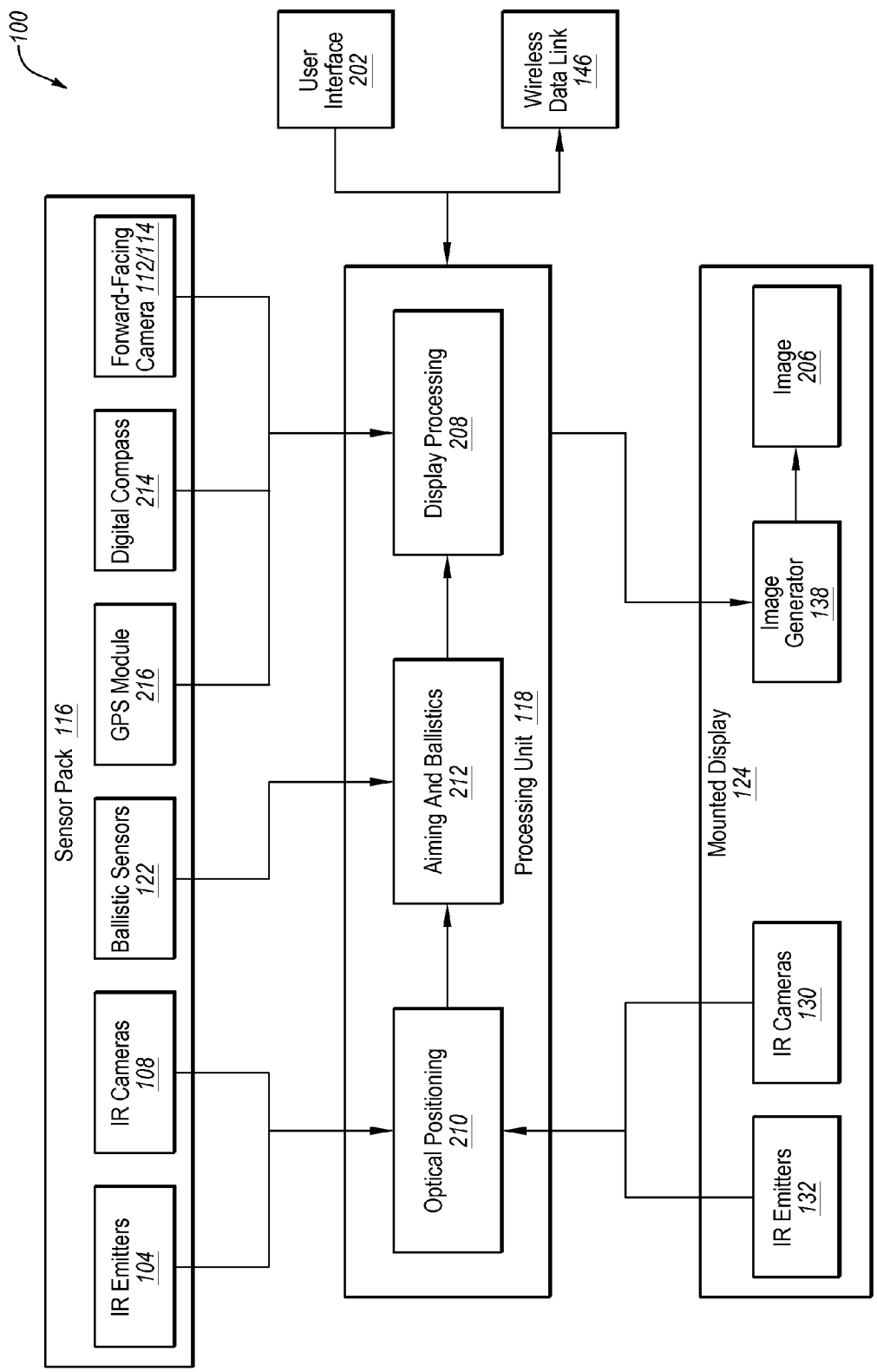
FIG. 2 illustrates a block diagram of the system of FIG. 1.

FIG. 2 illustrates a block diagram of the system 100 of FIG. 1. The system 100 includes the sensor pack 116, the processing unit 118, and the mounted display 124 of FIG. 1. FIG. 2 illustrates the communication of data in the system 100 that results in a holographic image 206 ("image 206" in FIG. 2). FIG. 2 is described with reference to a single holographic image 206. In this and other embodiments, multiple holographic images 206 may be generated, changed, and updated.

In the embodiment depicted in FIG. 2, the processing unit 118 samples data and translates appropriate information to correct the holographic image 206 during an initial determination of the holographic image 206 and during use, which may result in changes to the holographic image 206. For example, as a user moves her head or weapon (e.g., the weapon 102), the position of an aiming reticle may be corrected within the holographic image 206. Additionally, the other data such as azimuth, navigational information, positions, environmental conditions, team and unit information, weapons data, and other information independent of the aiming reticle may also be corrected and translated by the processing unit 118.

The processing unit 118 may include an optical positioning module 210 ("optical positioning" in FIG. 2), an aiming and ballistic module 212 ("aiming and ballistic" in FIG. 2), and a display processing module 208 ("display processing" in FIG. 2). Each of the modules 210, 212, and 208 receive data from one or more other components and output some information that may be communicated to the image generator 138, which includes the information in the holographic image 206.

Generally, the system 100 determines the appropriate position of the holographic images 206 to be superimposed or projected into the field of view of a user. A process of determining the appropriate position includes determining the relative positions of the weapon 102 and the mounted display 124. The determination of the relative positions may be accomplished in the optical positioning module 210. Specifically, the optical positioning module 210 utilizes the IR cameras 130 and 108 and the IR emitters 104 and 132 to determine the relative position and orientation of the weapon 102 and the mounted display 124 in a three-dimensional space. Some additional details of determining relative positions of the weapon 102 and the mounted display 124 are provided with reference to FIG. 3.

The relative positions may be communicated to the aiming and ballistic module 212. The aiming and ballistic module 212 may utilize data from one or more sensors 122 in ballistic calculations. For example, the ballistic calculations may be used to determine the point of impact of the weapon 102, which may be different from a linear projection of a bore of the weapon 102 depending on one or more environmental conditions (e.g., wind, barometric pressure, humidity, and the like).

The display processing module 208 may receive input from one or more of the forward-facing cameras 112 and 114, a digital compass 214, a GPS module 216, the communication link 146, and a user interface 202. Using input from one or more of these components (e.g., 216, 214, 112, 114, 202, and 146) along with the relative positions and ballistic calculations, the display processing module 208 may determine the position of the holographic images within the field of view of the user. Additionally, the display processing module 208 may enable optional features of the holographic images. For example, the display processing module 208 may determine whether to include a pop up picture from the forward-facing cameras 112 and 114, which may be selected by the user interface 202.

The display processing module 208 may include image processing software. The processing software may include executable instructions that when executed perform operations to process data from components (e.g., 216, 214, 112, 114, 202, and 146), data received from the aiming and ballistic module 212, data received from the optical positioning module 210, or any combination thereof. The parameters of the image processing software may be tunable and/or user configurable for accurate and appropriate usage. The image processing software may further include a calibration sequence for accurate translation of the data.

In some embodiments, the system 100 may include a gyroscopes and or a magnetometer configured to provide further data for the orientation of the weapon 102 with respect to gravitational pull or terrestrial magnetic forces.

Figure 3:
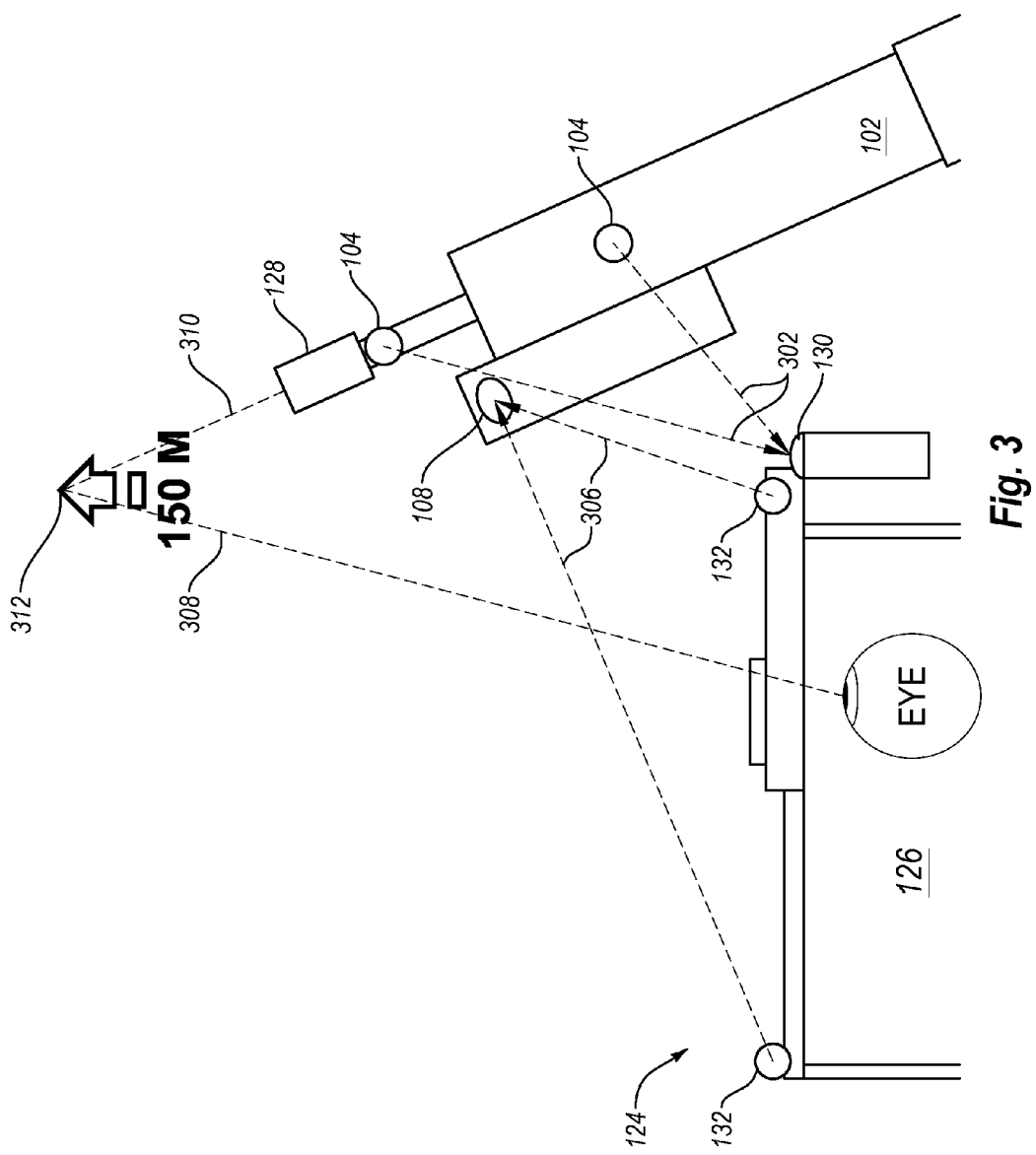
FIG. 3 illustrates an example calculation of a physical relationship between an example weapon and an example head mounted display that may be implemented in the system of FIG. 1.

FIG. 3 illustrates an example calculation of a physical relationship between the weapon 102 and the mounted display 124 that may be implemented by the system 100 of FIGS. 1 and 2. Multiple components discussed with reference to FIG. 1 are included in FIG. 3. Description of these components is not repeated with reference to FIG. 3.

In some embodiments, the weapon 102, the mounted display 124, or one or more subsystems included therein may be calibrated. For example, the weapon 102 may be set at a specific distance from the mounted display 124 and an initialized signal may be communicated therebetween. Additionally or alternatively, one or more biometric-specific quantities may be entered to accommodate for user-to-user differences. The calibration may be used to zero-out the user-to-user differences, parallax errors, and the like.

A calculation of a physical relationship between the weapon 102 and the mounted display 124 may be based at least partially on the IR cameras 108 and 130 and the IR emitters 104 and 132. The IR camera 108 depicted in FIG. 3 is a different position than in FIG. 1. Additionally, only one IR camera 130 is shown on the mounted display 124 in FIG. 3. By calculating the physical relationship between the weapon 102 and the mounted display 124, a position of an object 312 with respect to the weapon 102 and the mounted display 124 may also be determined. When the position of the object 312 is known in relationship to the weapon 102 and to the mounted display 124, holographic images based on a position of the weapon 102 may be superimposed and projected onto the field of view of the user 126. Additionally, the holographic images may be accurately positioned within the field of view and with respect to the object 312. Some additional details of the holographic images are discussed below.

To calculate the physical relationship, the IR emitters 132 mounted on the mounted display 124 emit an IR signal 306 at a particular wavelength that is detected by the IR camera 108 mounted to the weapon 102. Additionally, the IR emitters 104 mounted on the weapon 102 emit an IR signal 302 at a particular wavelength that is detected by the IR camera 130 mounted to the mounted display 124.

The IR camera 108 may determine the position of the mounted display 124 and the IR camera 130 may determine the position of the weapon 102. Thus, a line of sight, which is represented by a dashed line 308, may be determined and/or a point of aim, which is represented by a dashed line 310, of the weapon 102 may be determined. When the holographic images are generated, the holographic images are projected into the line of sight of the user 126. Other embodiments may include two or more IR emitters 123 and 104 and/or two or more IR cameras 130 and 108.

Use of the IR cameras 130 and 108 and IR emitters 104 and 132 may provide benefits over gyroscopes, magnetometers, etc. For example, the speed of the IR signals 306 and 302 is greater than those of gyroscopes and magnetometers. Additionally, the ability to filter potentially interfering signals is superior to gyroscopes and magnetometers. For example, the IR cameras 108 and 130 may include filters (144 of FIG. 1) such as dielectric stacks, wavelength-specific absorbing filters, or another similar filter that may select or allow transmission of a particular wavelength. Additionally or alternatively, the IR emitters 104 and 132 may be configured to emit at several wavelengths that may be automatically selected by the system 100 when other users or team members are present or manually selected by the user 126 to immediately change a wavelength of the IR signals 306 and 302. Selection of a particular wavelength may be useful when multiple systems 100 are used by together or the proximity between users is small.

Figure 4:
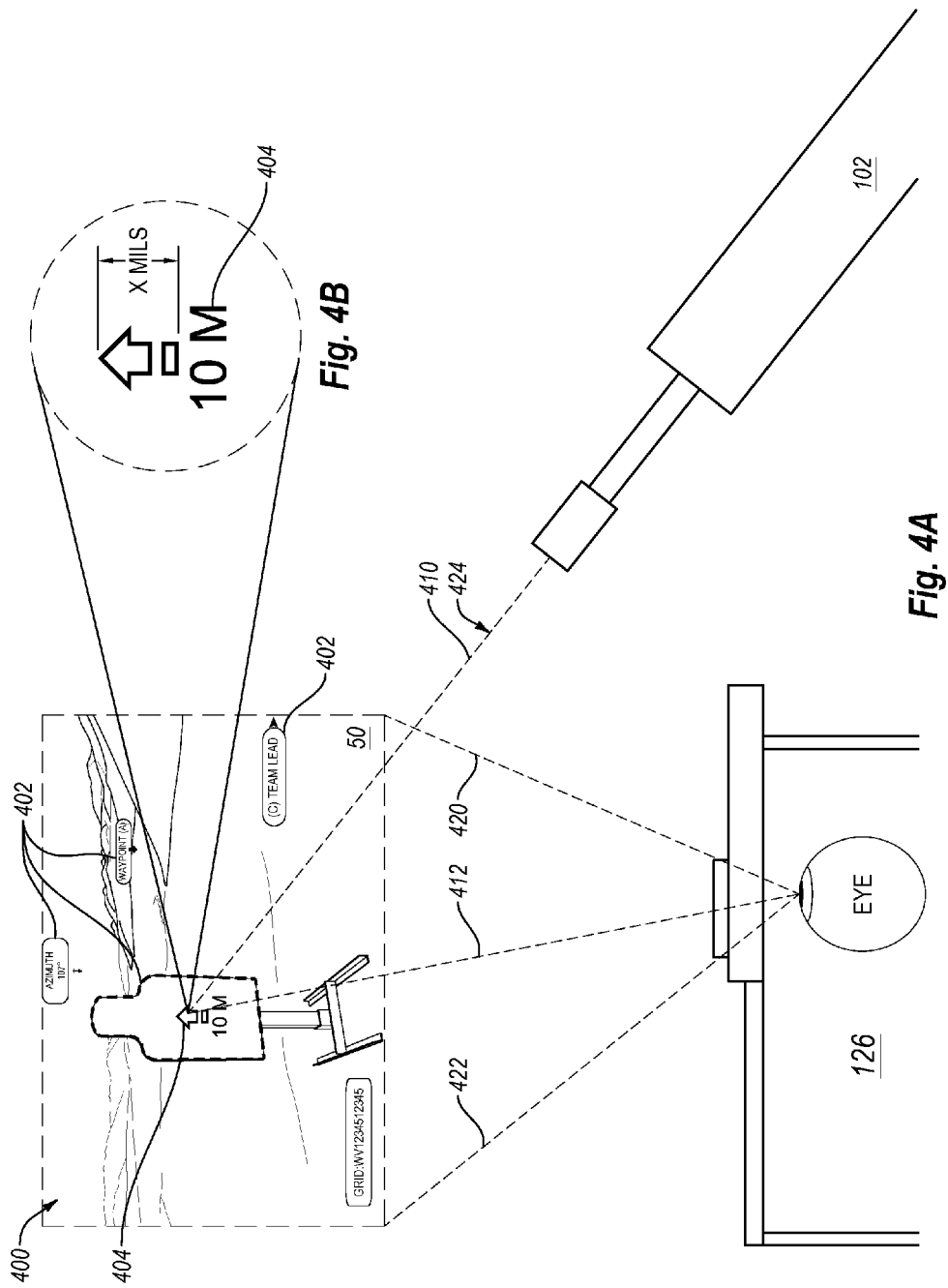
FIG. 4A illustrates an example field of view that may be generated by the system of FIG. 1.
FIG. 4B illustrates an example aiming reticle that may be generated in the field of view of FIG. 4A.

FIG. 4A illustrates an example field of view 50 with a holographic image 400 that may be generated by the system 100 of FIGS. 1 and 2. In FIG. 4A, the user 126 and the weapon 102 are depicted in relationship to the field of view 50. The extent of the field of view 50 is represented in FIG. 4A by dashed lines 420 and 422. Using the system 100, the field of view 50 of the user 126 may not be obstructed, thus the extent of the field of view 50 is similar to that of the user 126 wearing ordinary headwear. A point of aim 410 of the weapon 102 is indicated by a dashed line 424 extending from the weapon 102 to an aiming reticle 404.

The aiming reticle 404 may be one of multiple holographic image components 402 included in the holographic image 400 that is superimposed and projected in the field of view 50 of the user 126. An enlarged view of the aiming reticle 404 is depicted in FIG. 4B.

FIG. 4A demonstrates a functionality of the system 100. Specifically, the aiming reticle 404 may be superimposed and projected onto the field of view 50 of the user 126 at the point of aim 410 of the weapon 102. The point of aim 410 may be further coincident with a line of sight 412 at the aiming reticle 404. The user 126 may aim the weapon 102 using the aiming reticle 404 of the holographic image 400 superimposed in the field of view 50 rather than the aiming through a scope of the weapon 102.

The appropriate position of the aiming reticle 404 may coincide with the point of impact of a projectile fired from the weapon 102. The point of impact may be determined from the system 100 and/or ballistic calculations based on ballistic sensor data as described herein. Accordingly, the aiming reticle 404 and the point of aim 410 is not necessarily a linear projection of the bore 128 of the weapon 102. For example, the system 100 may include one or more ballistic calculations before superimposing the aiming reticle 404 onto the field of view 50. In these circumstances, a point of impact may be based on a calculated trajectory including the ballistic calculations. The point of impact as well as one or more of the ballistic calculations may be included when the position of the aiming reticle 404 is superimposed onto the field of view 50. That is, the ballistic calculations may alter the position of the aiming reticle 404 from the linear projection calculated by optically positioning the bore 128 of the weapon 102 using the system 100. In effect, the position of the aiming reticle 404 may be calculated initially by an optical position calculation then modified or supplemented by the ballistic calculations.

In addition to the aiming reticle 404, the system 100 may generate one or more other holographic image components 402 in the holographic image 400 superimposed onto the field of view 50. The field of view 50 may generally include objects seen by the user 126 superimposed with respect to the objects. The holographic image components 402 may be an overlay, additional battlefield information, a superimposed target a thermal overlay, an IR overlay, GPS positional information, etc. Some examples of the holographic image components 402 superimposed onto the field of view 50 are discussed with reference to FIGS. 5-8.

Figure 5:
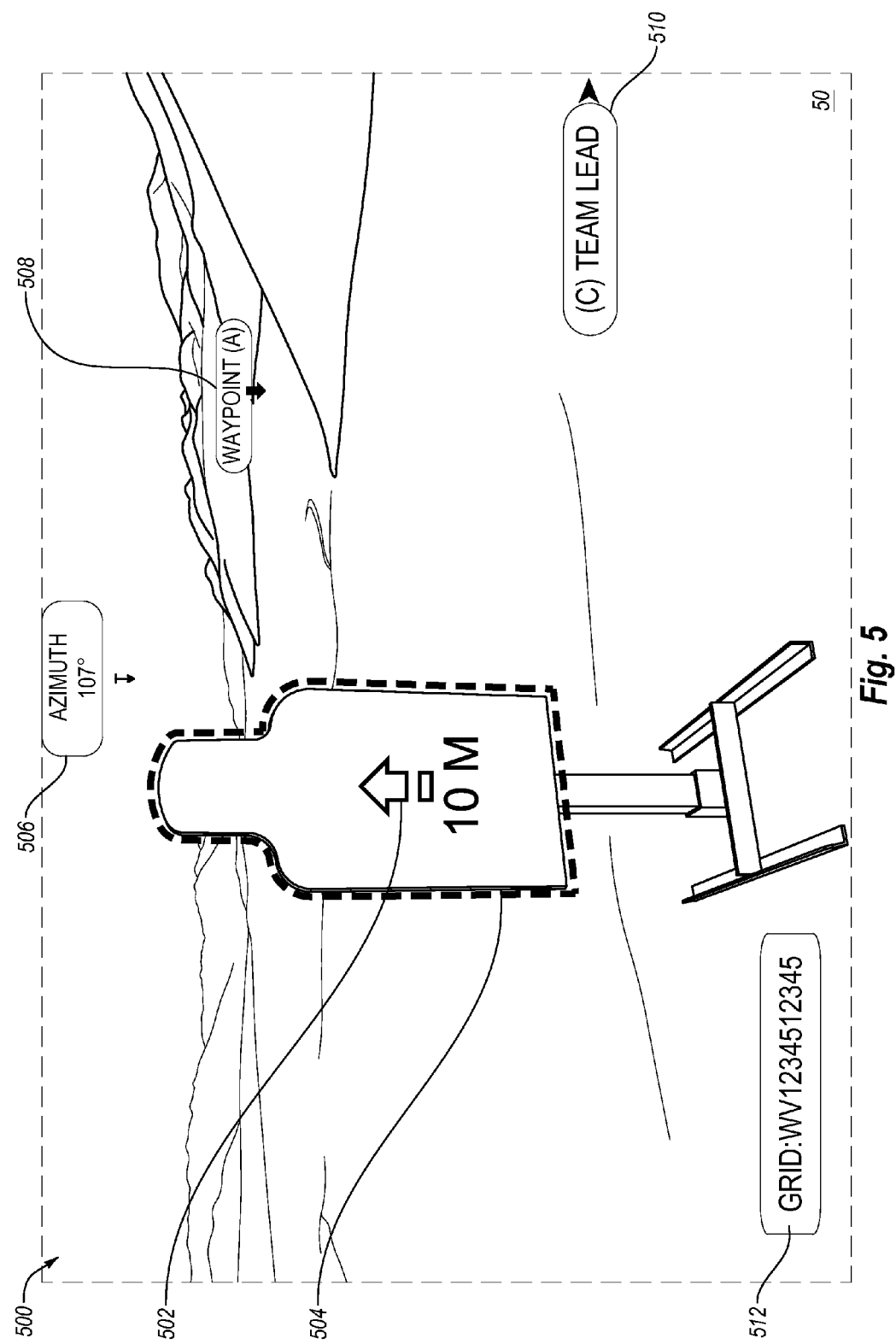
FIG. 5 illustrates an example holographic image that may be generated by the system of FIG. 1.

FIG. 5 illustrates an example holographic image 500 that may be generated by the system 100 of FIG. 1 and FIG. 2. The holographic image 500 is projected or superimposed over the field of view 50 of a user. The holographic image 500 is depicted in FIG. 5 over what a user may see looking out over a landscape. That is, other than the holographic image 500, the landscape, etc. are viewed normally.

The holographic image 500 includes an aiming reticle 502, a target overlay 504, an azimuth or heading 506, location of a waypoint 508, direction of nearby friendly forces 510, and current global coordinates 512. The aiming reticle 502 is substantially similar to and may correspond to the aiming reticle 404 of FIGS. 4A and 4B.

The aiming reticle 502 includes the target range indication determined by the system 100 of FIGS. 1 and 2. The target overlay 504 may include a thermally generated image or be formed from other non-visible forms of electromagnetic radiation. The target overlay 504 may be generated from one or more forward-facing camera such as the forward-facing cameras 112 and 114 of FIG. 1.

The azimuth or heading 506, the location of the waypoint 508, the direction of nearby friendly forces 510, and the current global coordinates 512 may be determined by an electronic compass, a combination of the electronic compass and GPS data, known coordinates, data communicated from an outside entity, or any combination thereof.

In some embodiments, a holographic image may include additional team members and/or information that pertain to the additional team members. For example, FIG. 6 illustrates data gathered by the system 100 of FIGS. 1 and 2 to generate holographic images including additional team member information.

Figure 6:
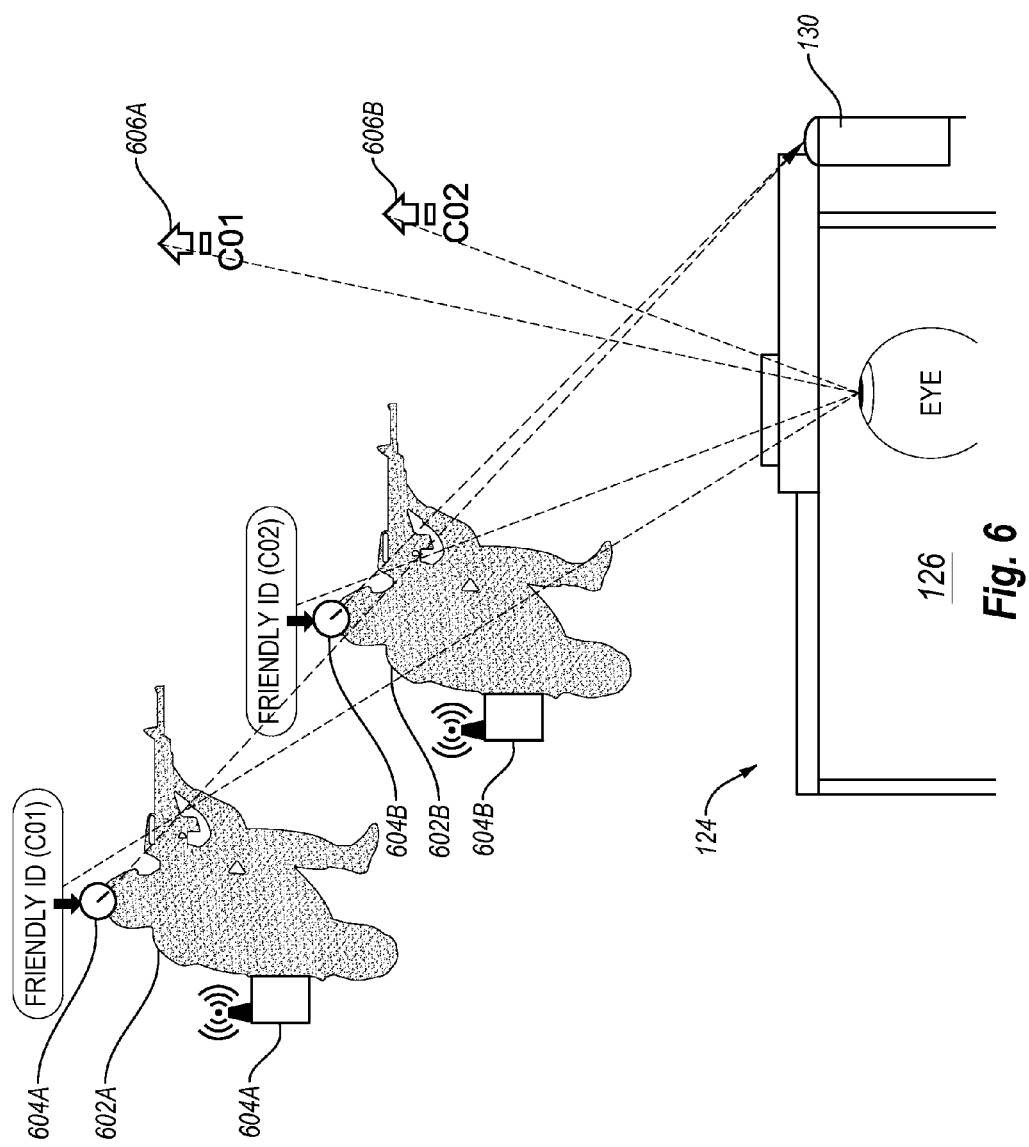
FIG. 6 illustrates an example calculation of information pertaining to team members that may be implemented by the system of FIG. 1.

In FIG. 6, a first team member 602A and a second team member 602B are each fitted with systems 604A and 604B substantially similar to the system 100 described with reference to FIGS. 1 and 2. Specifically, each of the first system 604A and the second system 604B include at least an identifying IR emitter and a processing unit. The identifying IR emitter is substantially similar to the IR emitters 104 and 132 except the identifying IR emitter identifies an individual team member (e.g., 602A or 602B). The processing unit is substantially similar to the processing unit 118 discussed herein.

With combined reference to FIGS. 1 and 6, the first team member 602A includes a first system 604A and the second team member 602B includes a second system 604B. The user 126 can configure the IR camera 130 to detect the IR signals emitted from the first system 604A and the second system 604B. Each of the first system 604A and the second system 604B may emit IR signals at unique or distinct wavelengths. Thus, the IR camera 130 may detect that the first system 604A is associated with the first team member 602A and that the second system 604B is associated with the second team member 602B by the unique or distinct wavelength. Additionally, GPS data communicated from the processing units may be used to reconcile a position and identification of a first team member 602A and/or a second team member 602B. For instance, signals the identifying IR emitter may be combined with GPS data communicated by the first team member 602A and/or a second team member 602B to ensure proper identification.

Additionally, reticle positions 606A and 606B may be determined for one or more of the team members 602A and 602B. In some embodiments, the first system 604A may determine the first reticle position 606A and communicate the first reticle position 606A to the mounted display 124 or the processing unit 118 of the user 126. Likewise, the second system 604B may determine the second reticle position 606B and communicate it to the mounted display 124. Additionally or alternatively, a combination of the IR camera 130 and the communicated reticle positions 606A and 606B may be used to determine the reticle positions 606A and 606B of the team members 602A and 602B.

From detection of the IR signals by the IR camera 130 and the reticle positions 606A and 606B received or determined by the mounted display 124, a holographic image can include identification tags images (labeled 702 in FIGS. 7 and 8) for each of the team members 602A and 602B as well as reticles aiming point images for each of the team members 602A and 602B.

Figure 7:
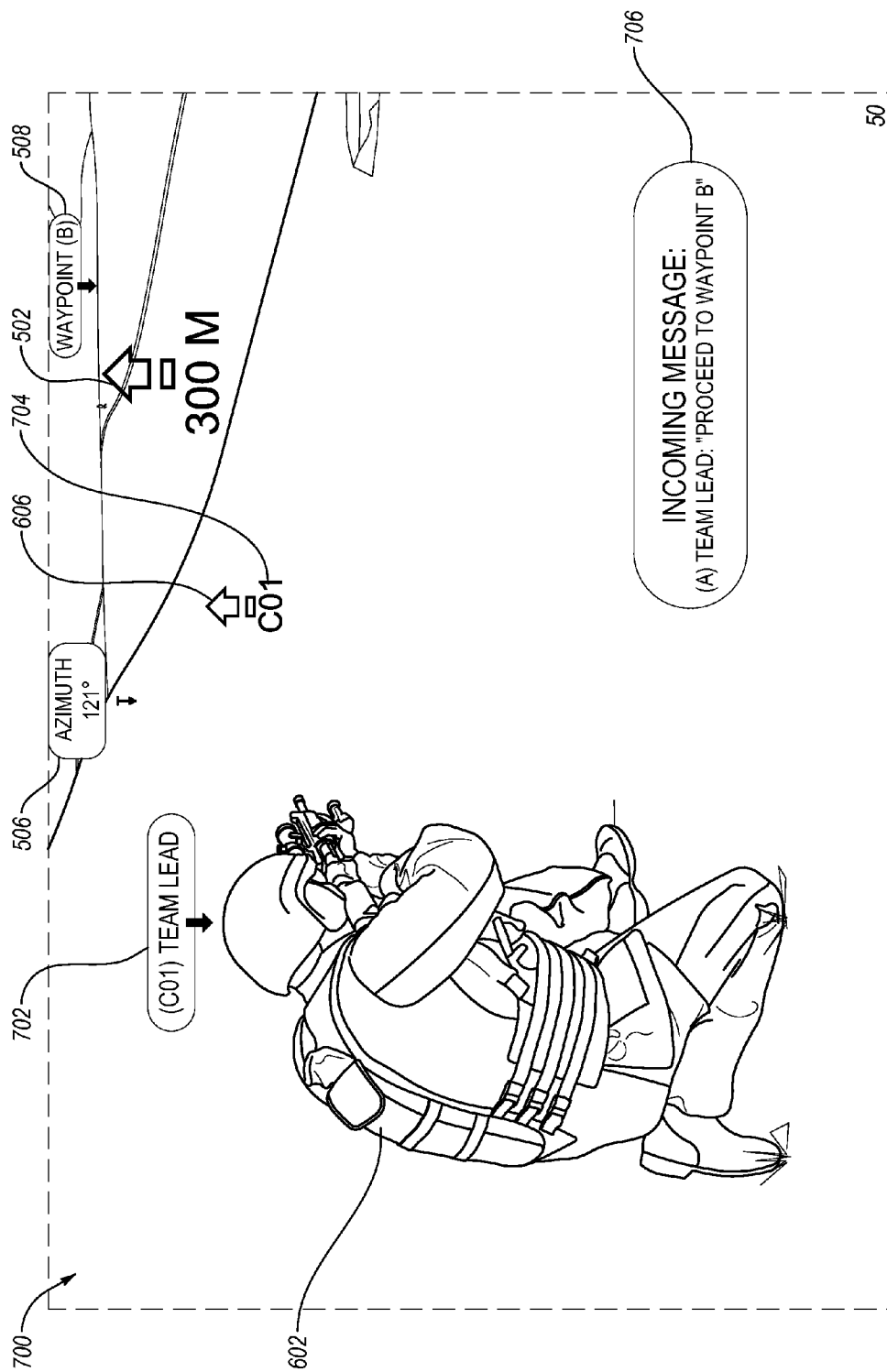
FIG. 7 illustrates another example holographic image that may be generated by the system of FIG. 1.

FIG. 7 illustrates another example holographic image 700 that may be generated by the system 100 of FIGS. 1 and 2. The holographic image 700 includes some images (e.g., 502, 506, and 508) from FIG. 5 along with information related to team members as described with reference to FIG. 6. Details of the images 502, 506, and 508 are not repeated with reference to FIG. 7; however, it is understood that the images 502, 506, and 508 may be included in the holographic image 700.

With combined reference to FIGS. 1 and 7, the holographic image 700 is projected or superimposed over the field of view 50 of a user. The holographic image 700 is depicted in FIG. 7 over what the user 126 may see looking out over a landscape. That is, other than the holographic image 700 and components (e.g., 702, 704, 502, 508, and 506) thereof, the landscape, etc. are viewed normally.

The holographic image 700 includes an optical reticle 704 indicating a reticle position 606 of a weapon of a team member 602. Additionally, an identification tag 702 indicating the specific team member 602 is included in the holographic image 700. In some embodiments, the identification tag 702 and/or the optical reticle 704 may be displayed with unique identifiable colors, shapes, text, or some combination thereof. Wireless data may also be received from and transmitted to networks and other team members. Specific algorithms may be used to structure communal team data (e.g., the team members 602, the optical reticles 704, the identification tags 702, and/or the reticle positions 606) and network data in ways to optimize the utility of the information.

Additionally, the holographic image 700 includes a communication image 706. The communication image 706 may be a visual display of a communication such as a SMS text, a MMS, and e-mail message, etc. The communication image 706 may include specific or unique colors or text indicating a source or a subject matter. For example, a communication from a superior addressed to the user 126 may be a first color and a communication addressed to another user or team member may be a second color.

Figure 8:
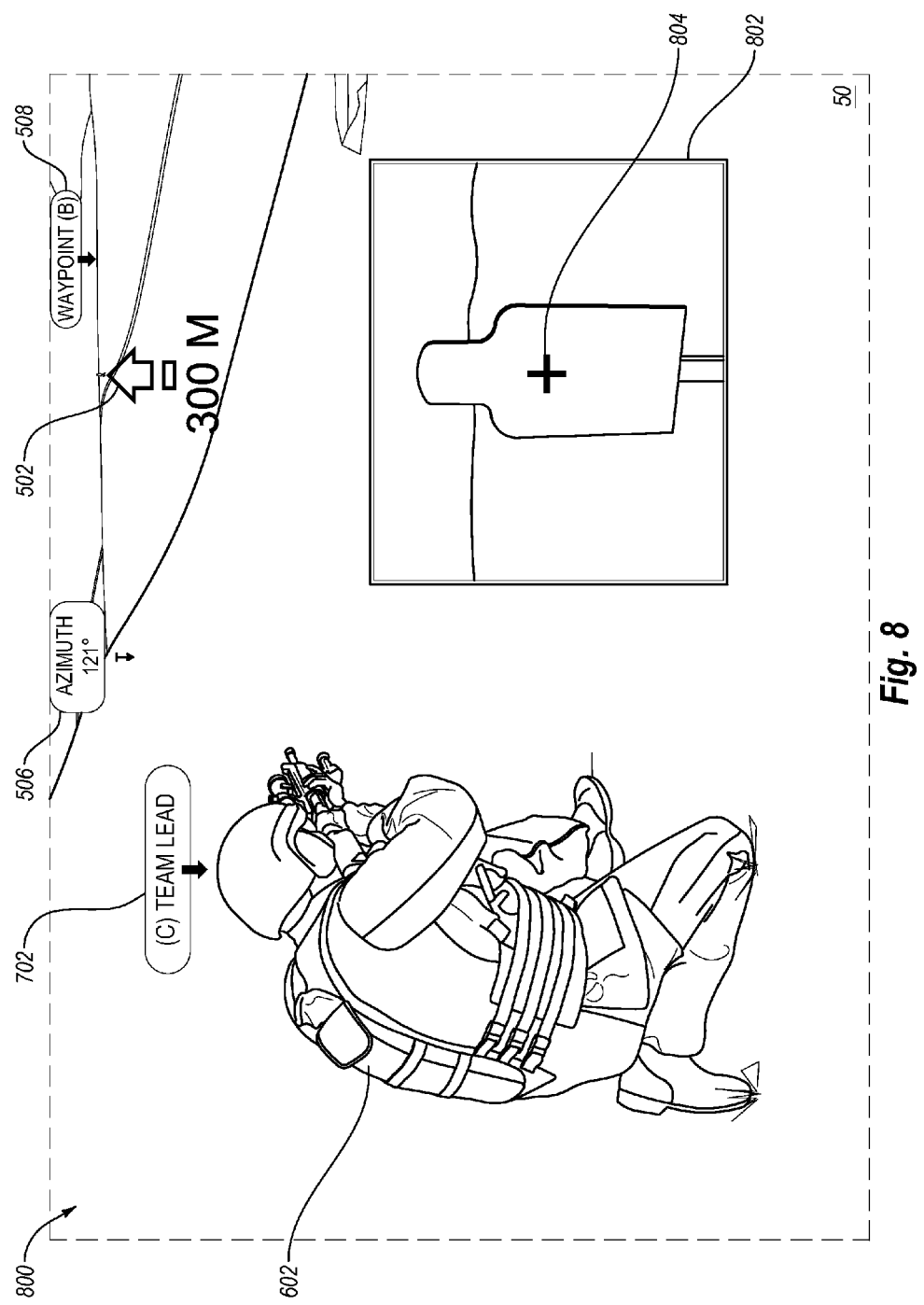
FIG. 8 illustrates an example projected pop up picture that may be generated by the system of FIG. 1.

FIG. 8 illustrates another example holographic image 800 that may be generated by the system 100 of FIGS. 1 and 2 and superimposed in the field of view 50. The holographic image 800 is substantially similar to the holographic image of FIG. 7 with the addition of a projected pop up picture 802. Some of the features described with reference to FIG. 7 are included in FIG. 8, but are not explicitly described. It is to be understood that the holographic image 800 may include these features described with reference to FIG. 7.

With combined reference to FIGS. 1 and 8, the pop up picture 802 may be a telescopic image from a weapon such as the weapon 102. In some embodiments, the pop up picture 802 may include an image as observed from one or more forward-facing cameras 114 and 112. Additionally or alternatively, the pop up picture 802 may be transmitted to the user 126 from a team member or vice versa. For example, the team member 602 may transmit an image from a forward-facing camera mounted on a weapon of the team member 602.

In some embodiments in which the pop up picture 802 is generated by a forward-facing camera 112 or 114 on the weapon 102 of the user 126, the pop up picture 802 may include crosshairs 804. The crosshairs 804 may correspond to the aiming reticle 502 in the holographic image 800. Thus, in the holographic image 800, the user 126 can see the aiming reticle 502 and a zoomed-in view of a target through the pop up picture 802. As discussed above, positions of the aiming reticle 502 and/or the crosshairs 804 may incorporate one or more ballistic calculations based on ballistic data acquired from the sensors 122.

In some embodiments, the pop up picture 802 does not move when the user 126 moves her head. The pop up picture 802 stays in a location within the field of view 50 of the user 126 regardless of the orientations of the mounted display 124. The actual image on the pop up picture 802 changes with variation in the orientation of the weapon 102 (or the weapon of the team member 602) or the forward-facing camera 112 or 114, but the placement within the field of view 50 remains constant. Additionally or alternatively, a user interface may enable a user to zoom in, zoom out, switch inputs (e.g. from visible light to thermal imaging), enable/disable the pop up picture 802, and the like.

Some applications of the pop up picture 802 may enable the user 126 to look around corners by orienting the weapon 102 around the corner without exposing the user 126 to danger. In addition, the user 126 may use the pop up picture 802 to inspect a target prior to firing and/or use the pop up picture 802 as a back-up aiming system when one or more of the optical positioning components (e.g., 104, 108, 130, and 132) of the system 100 are not operational or inactive.

Figure 9:
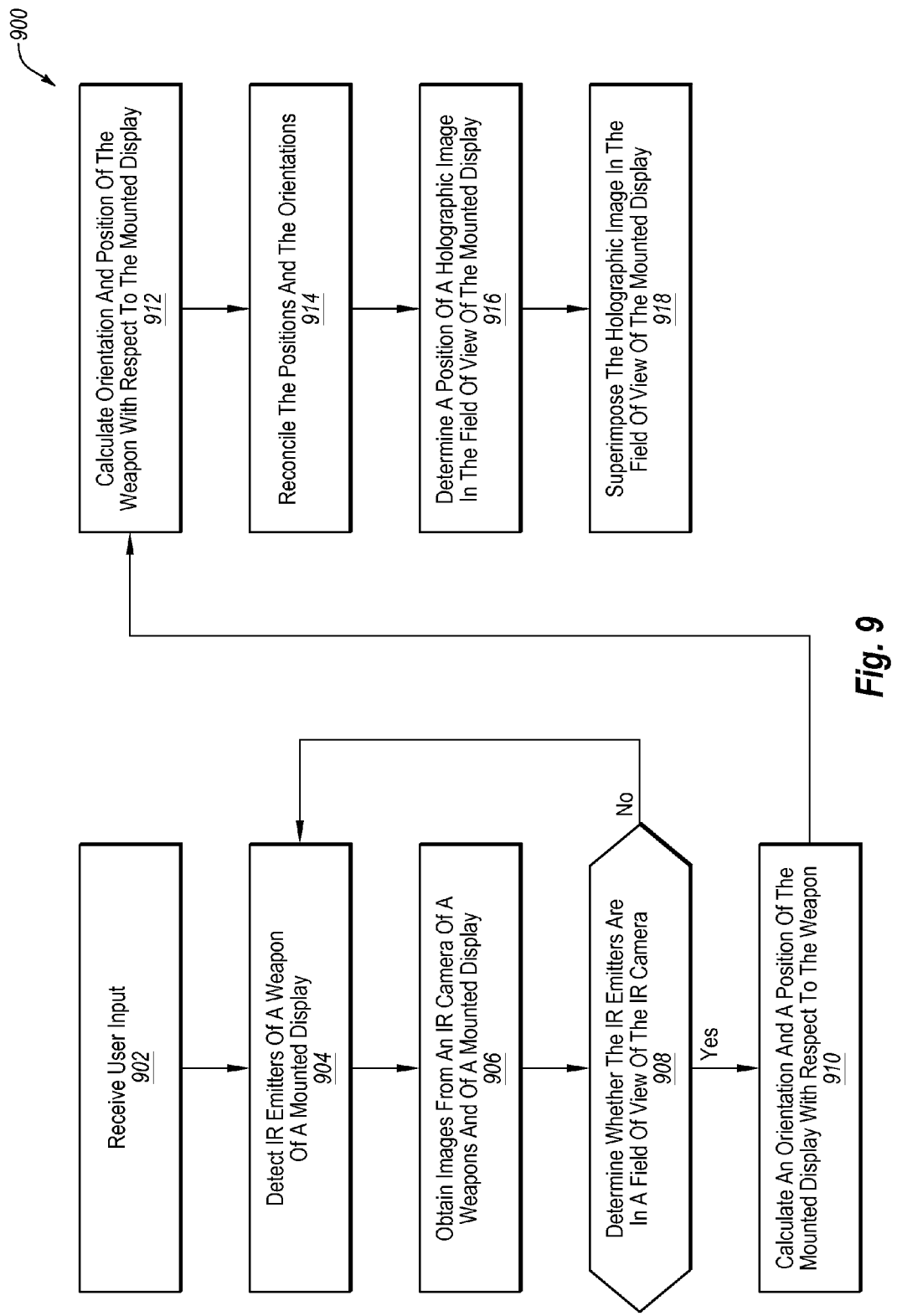
FIG. 9 is a flow diagram of an example method of superimposing a holographic image in a field of view of a mounted display.

FIG. 9 is a flow diagram of an example method 900 of superimposing a holographic image in a field of view of a mounted display, arranged in accordance with at least one embodiment described herein. The method 900 may be programmably performed in some embodiments by the processing unit 118 described with reference to FIG. 1. The processing unit 118 may include or may be communicatively coupled to a non-transitory computer-readable medium (e.g., the memory) having stored thereon or encoded therein programming code or instructions that are executable by a processor to perform or cause performance of the method 900. The processing unit 118 may include a processor that is configured to execute computer instructions to cause or control performance of the method 900. Although illustrated as discrete blocks, various blocks may be divided into additional blocks, combined into fewer blocks, or eliminated, depending on the desired implementation.

The method 900 may begin at block 902. At block 902, user input may be received. For example, the user input may include a selection of one or more holographic image components such as an aiming reticle that may be included in a holographic image. At block 904, IR emitters of a weapon and of a mounted display may be detected.

At block 906, images may be obtained from an IR camera of the weapon and of the mounted display. For example, an IR camera mounted on the weapon may detect an IR signal emitted from an IR emitter of the mounted display and an IR camera of the mounted display may detect another IR signal emitted from an IR emitter of the weapon. The detected IR signals may be communicated to a processing unit. At block 908, it may be determined whether the IR emitters are in a field of view of the IR camera. In response to the IR emitters not being in the field of view of the IR camera ("No" at block 908), the method 900 may proceed to block 906. In response to the IR emitters being in the field of view of the IR camera ("Yes" at block 908), the method 900 may proceed to block 910. At block 910, an orientation and a position of the mounted display with respect to the weapon may be calculated. At block 912, an orientation and a position of the weapon with respect to the mounted display may be calculated. At block 914, the orientation and the position of the mounted display with respect to the weapon may be reconciled with the orientation and the position of the weapon with respect to the mounted display. At block 916, a position of a holographic image that includes the selected holographic image components (e.g., the aiming reticle) may be determined in the field of view of the mounted display. At block 918, the holographic image may be superimposed in the field of view of the mounted display.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

FIGS. 10A-10D are a flow diagram of an example method 1000 of holographic image generation, arranged in accordance with at least one embodiment described herein. The method 1000 may be programmably performed in some embodiments by the processing unit 118 described with reference to FIG. 1. The processing unit 118 may include or may be communicatively coupled to a non-transitory computer-readable medium (e.g., the memory) having stored thereon or encoded therein programming code or instructions that are executable by a processor to perform or cause performance of the method 1000. The processing unit 118 may include a processor that is configured to execute computer instructions to cause or control performance of the method 1000. Although illustrated as discrete blocks, various blocks may be divided into additional blocks, combined into fewer blocks, or eliminated, depending on the desired implementation.

Figure 10A:
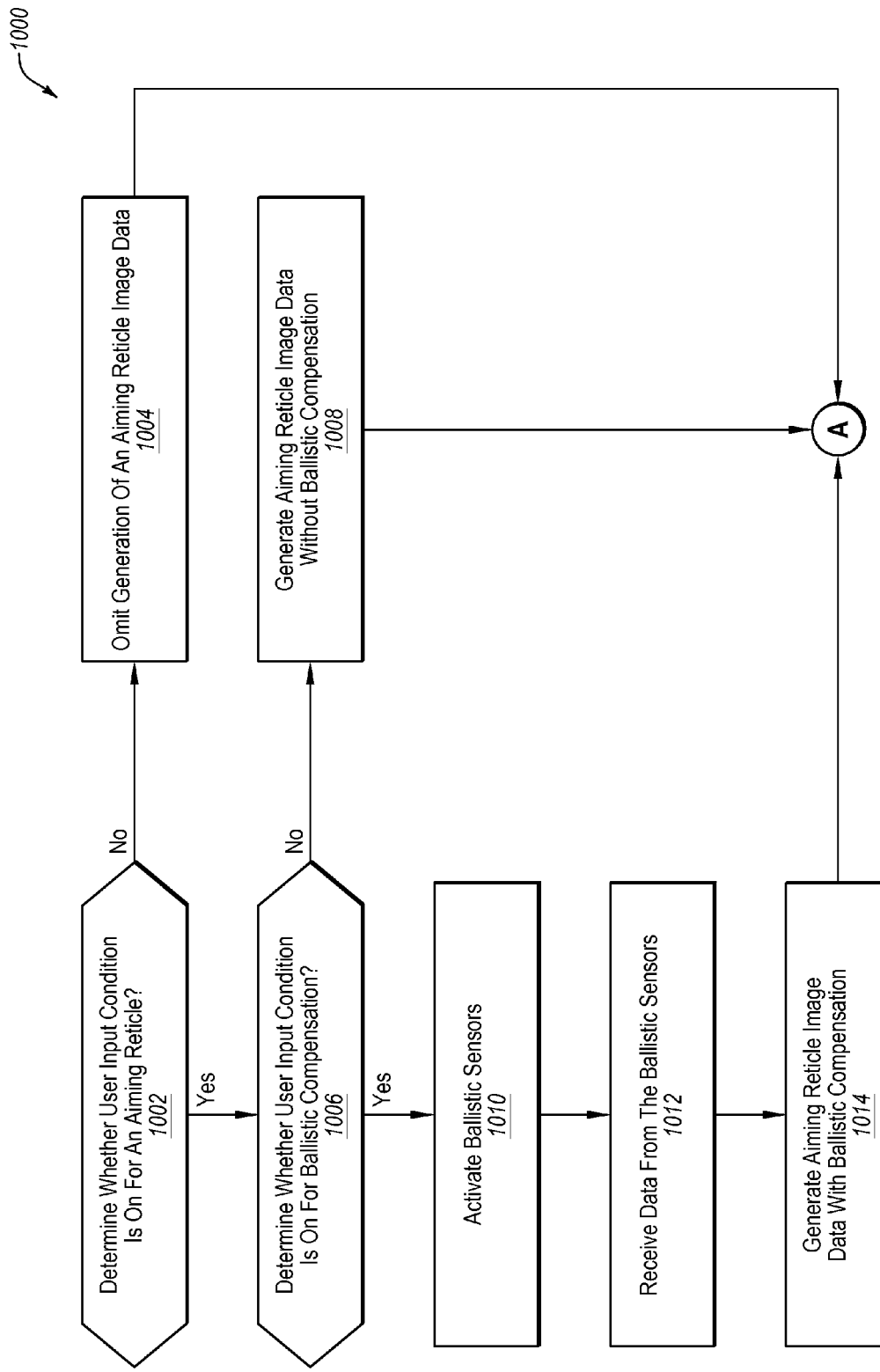
FIGS. 10A-10D are a flow diagram of an example method of holographic image generation, all in accordance with at least one embodiment described herein.

Referring to FIG. 10A, the method 1000 may begin at block 1002. At block 1002, it may be determined whether a user input condition is on for an aiming reticle. In response to the user input condition being off ("No" at block 1002), the method 1000 may proceed to block 1004. In response to the user input condition being on ("Yes" at block 1002), the method 1000 may proceed to block 1006. At block 1004, generation of an aiming reticle holographic image may be omitted.

At block 1006, it may be determined whether a user input condition is on for ballistic compensation. In response to the user input condition being off ("No" at block 1006), the method 1000 may proceed to block 1008. In response to the user input condition being on ("Yes" at block 1006), the method 1000 may proceed to block 1010. At block 1008, an aiming reticle holographic image may be generated without ballistic compensation. At block 1010, ballistic sensors may be activated. At block 1012, data may be received from the ballistic sensors. At block 1014, the aiming reticle image data may be generated with ballistic compensation.

Figure 10B:
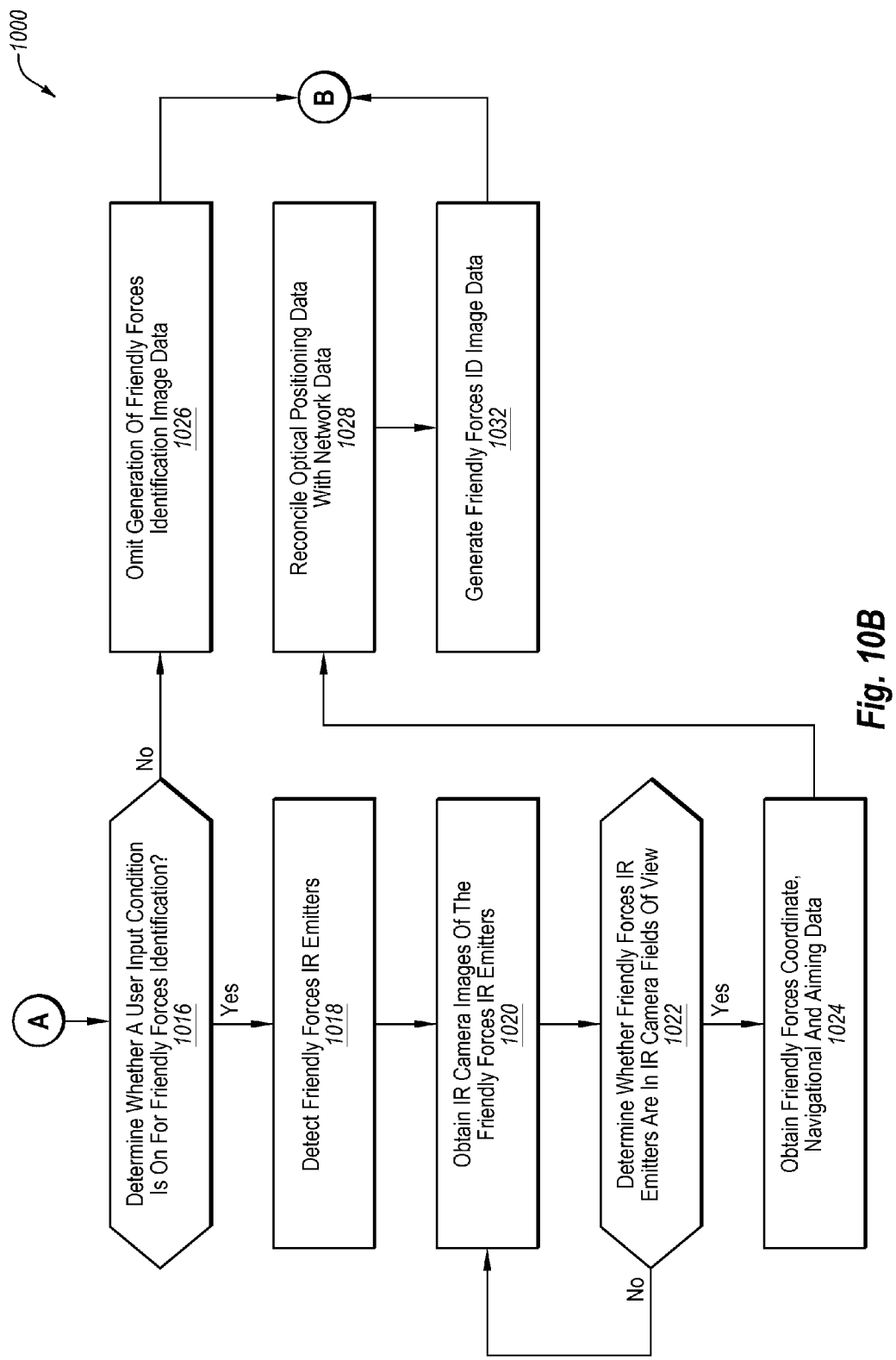

Referring to FIG. 10B, at block 1016, it may be determined whether a user input condition is on for friendly forces identification. In response to the user input condition being off ("No" at block 1016), the method 1000 may proceed to block 1026. In response to the user input condition being on ("Yes" at block 1016), the method 1000 may proceed to block 1018. At block 1026, generation of friendly forces identification image data may be omitted.

At block 1018, friendly forces IR emitters may be detected. At block 1020, IR camera images of the friendly forces IR emitters may be obtained. At block 1022, it may be determined whether friendly forces IR emitters are in the field of view of the IR camera. In response to the friendly forces IR emitters not being in the field of view of the IR camera ("No" at block 1020), the method 1000 may proceed to block 1020. In response to the friendly forces IR emitters being in the field of view of the IR camera ("Yes" at block 1020), the method 1000 may proceed to block 1024. At block 1024, friendly forces data may be obtained. For example, the friendly forces data may include positional data (e.g., coordinates), navigational data, aiming reticle data, or some combination thereof. At block 1028, optical positioning date may be reconciled with network data. At block 1032, friendly forces identification image data may be generated.

Figure 10C:
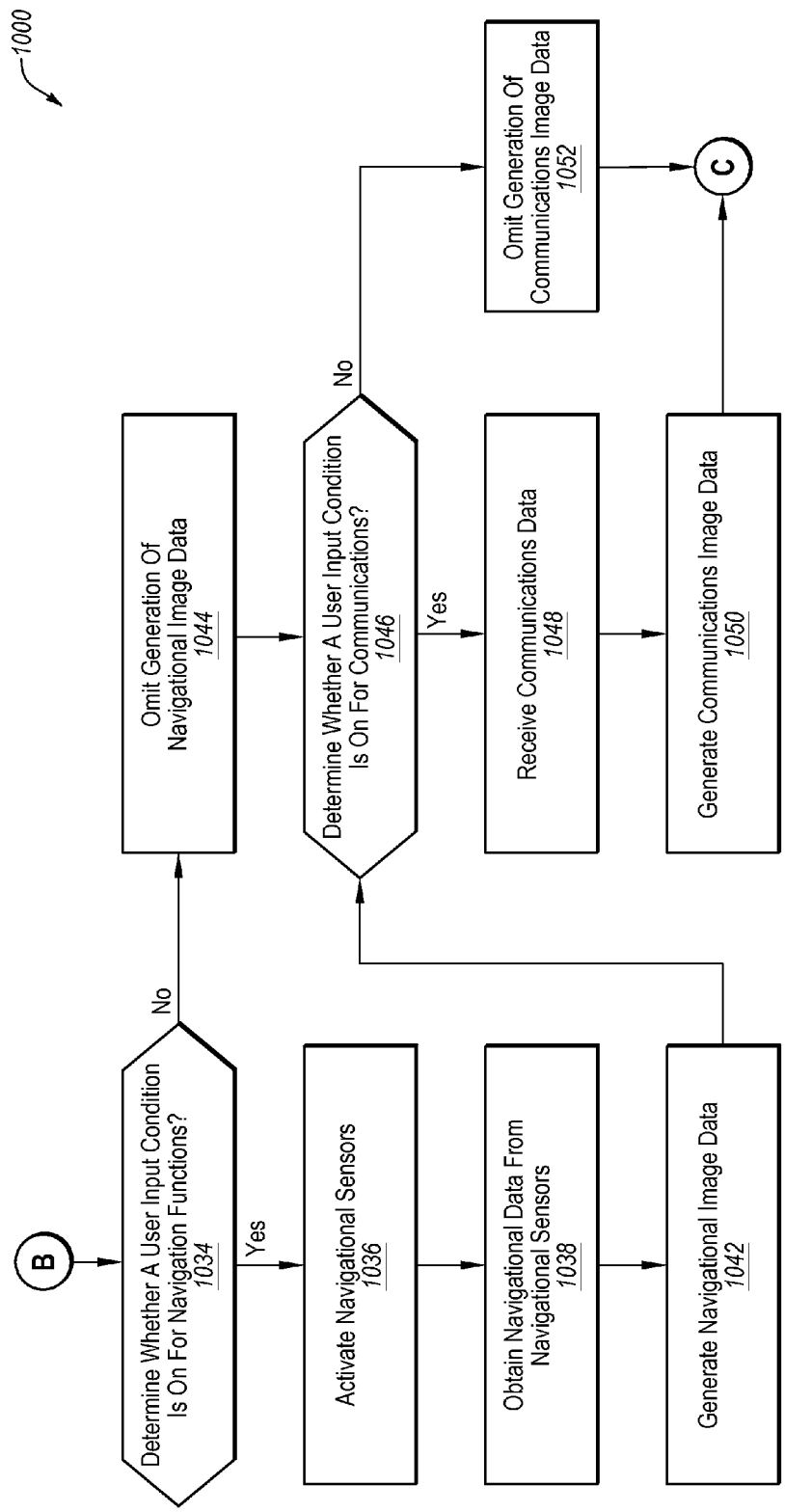

Referring to FIG. 10C, at block 1034, it may be determined whether a user input condition is on for navigation functions. In response to the user input condition being off ("No" at block 1034), the method 1000 may proceed to block 1044. In response to the user input condition being on ("Yes" at block 1034), the method 1000 may proceed to block 1036. At block 1044, generation of navigational image data may be omitted. At block 1036, navigational sensors may be activated. At block 1038, navigational data may be obtained from navigational sensors. At block 1042, navigational image data may be generated.

At block 1046, it may be determined whether a user input condition is on for communications. In response to the user input condition being off ("No" at block 1046), the method 1000 may proceed to block 1052. In response to the user input condition being on ("Yes" at block 1046), the method 1000 may proceed to block 1048. At block 1052, generation of communication image data may be omitted. At block 1048, communication data may be received. At block 1050, communications image data may be generated.

Figure 10D:
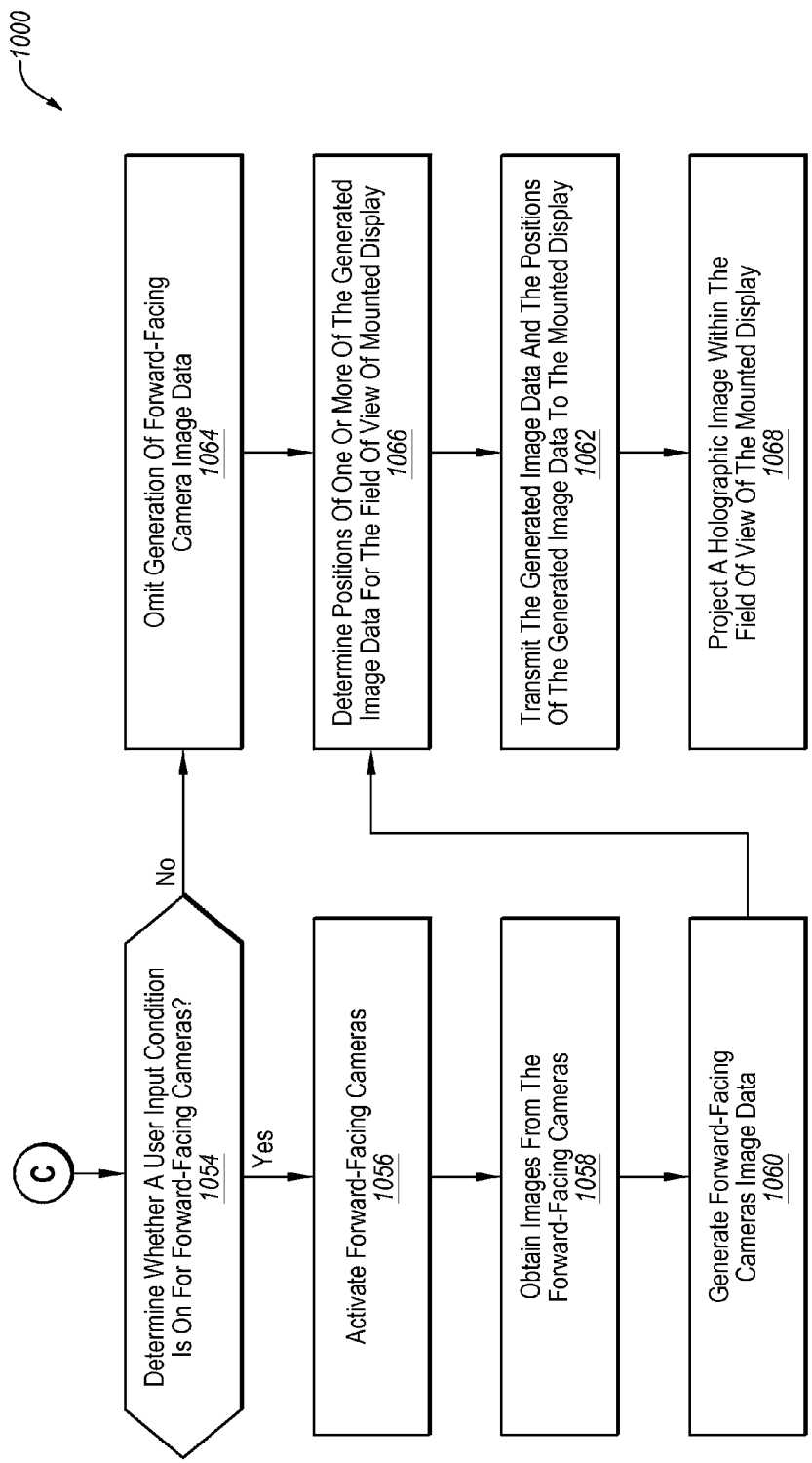

Referring to FIG. 10D, at block 1054, it may be determined whether a user input condition is on for forward-facing cameras. In response to the user input condition being off ("No" at block 1054), the method 1000 may proceed to block 1064. In response to the user input condition being on ("Yes" at block 1054), the method 1000 may proceed to block 1056. At block 1064, generation of forward-facing camera image data may be omitted.

At block 1056, forward-facing cameras may be activated. At block 1058, images may be obtained from the forward-facing cameras. At block 1060, forward-facing cameras image data may be generated. At block 1066, positions of the generated image data may be determined for the field of view of the mounted display. At block 1062, the generated image data and the positions of the generated image data may be transmitted to the mounted display. At block 1068, a holographic image may be projected within the field of view of the mounted display.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise non-transitory computer-readable storage media including RAM, ROM, EEPROM, CD-ROM or other optical disk storage, magnetic disk storage or other magnetic storage devices, or any other non-transitory storage medium which may be used to carry or store desired program code means in the form of computer-executable instructions or data structures and which may be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations may be made hereto without departing from the spirit and scope of the invention.

What is claimed is:

1. An optical positioning aiming system comprising:
    an optical positioning subsystem including:
    a processing unit;
    one or more infrared (IR) emitters mounted to a weapon;
    one or more IR emitters mounted to a head mounted display;
    one or more IR cameras mounted to the weapon that receive an IR signal emitted from the one or more IR emitters mounted to the head mounted display; and
    one or more IR cameras mounted to the head mounted display that receive an IR signal emitted from the one or more IR emitters mounted to the weapon,
    wherein during operation of the optical positioning subsystem:
        the IR cameras mounted to the weapon determine, based at least partially on the IR signal emitted from the one or more IR emitters mounted to the head mounted display, a position of the IR emitters mounted on the head mounted display relative to the weapon;
        the IR cameras mounted to the head mounted display determine, based at least partially on the IR signal emitted from the one or more IR emitters mounted to the weapon, a position of the IR emitters mounted to the weapon relative to the head mounted display, and
        the processing unit receives the position of the IR emitters mounted on the head mounted display, the position of the IR emitters mounted to the weapon, determines a line of sight of a user based at least partially on the position of the IR emitters mounted on the head mounted display, determines a point of aim of the weapon based at least partially on the position of the IR emitters mounted to the weapon, and determines a holographic aiming reticle to be displayed within a field of view of the user such that the holographic aiming reticle is positioned in the field of view at the point of aim of the weapon.

2. The system of claim 1, wherein the one or more IR cameras mounted on the head mounted display are configured to detect:
    a first IR signal from an IR emitter of a team member, the first IR signal having a first wavelength;

a second IR signal from an IR emitter of the weapon, the second IR signal having a second wavelength; and a third IR signal from the IR emitter mounted to the head mounted display, the third IR signal having a third wavelength, wherein the first, the second, and the third wavelengths are different and changeable.

3. The system of claim 1, wherein the holographic aiming reticle is free to move within the field of view as a position of the holographic aiming reticle is determined.

4. The system of claim 1, wherein during operation:

the processing unit determines information pertaining to a team member, the information is used to generate components of a holographic image, and the components include an identification tag that is superimposed over the team member within the field of view of the user.

5. The system of claim 1, wherein during operation:

the processing unit determines a holographic image including an overlay;

the overlay includes a non-visible light overlay; and the non-visible light overlay includes one or more of an IR overlay and a thermal overlay; and the overlay is superimposed over an object within the field of view.

6. The system of claim 1, further comprising a ballistic sensor, wherein during operation: the processing unit determines a holographic image projected onto a mounted display based on data acquired by the ballistic sensor and the optical positioning subsystem.

7. A method of superimposing a holographic image in a field of view of a head mounted display (mounted display), the method comprising:

receiving user input including a selection of holographic image components to include in a holographic image;

detecting IR emitters of a weapon and IR emitters of a mounted display;

obtaining images from an IR camera of the weapon and an IR camera of the mounted display;

determining whether the IR emitters are in a field of view of the IR cameras;

in response to the IR emitters not being in the field of view of the IR camera, continuing to obtain images from the IR camera of the weapon and the IR camera of the mounted display until the IR emitters are in the field of view of the IR cameras;

in response to the IR emitters being in the field of view of the IR camera:

calculating an orientation and a position of the mounted display with respect to the weapon based at least partially on the IR emitters of the weapon;

calculating an orientation and a position of the weapon with respect to the mounted display based at least partially on the IR emitters of the mounted display;

reconciling the orientation and the position of the mounted display with respect to the weapon with the orientation and the position of the weapon with respect to the mounted display;

determining a line of sight of a user based at least partially on the position of the IR emitters mounted on the head mounted display, determining a point of aim of the weapon based at least partially on the position of the IR emitters mounted to the weapon, determining a position of a holographic aiming reticle to be displayed within in the field of view of the mounted display based on the reconciled relative positions and orientations; and superimposing the holographic aiming reticle in the field of view at the point of aim of the weapon.

8. An optical positioning subsystem configured to determine relative positions of a weapon and a head mounted display and to generate and position a holographic image into a field of view of the head mounted display, the optical positioning subsystem including:

an infrared (IR) emitter mounted to a weapon;

an IR emitter mounted to the head mounted display;

an IR camera mounted to the weapon that receive an IR signal emitted from the IR emitter mounted to the head mounted display;

an IR camera mounted to the head mounted display that receive an IR signal emitted from the IR emitter mounted to the weapon; and a processing unit, wherein during operation of the optical positioning subsystem, the processing unit:

receives a first signal from the IR camera mounted to the weapon, the first signal being indicative of the IR signal emitted from the IR emitter mounted to the head mounted display and a position of the IR emitters mounted on the head mounted display relative to the weapon;

receives a second signal from the IR camera mounted to the head mounted display, the second signal being indicative of the IR signal emitted from the IR emitter mounted to the weapon;

determines a relative position and orientation of the weapon with respect to the head mounted display based at least partially on first signal;

determines a relative position and orientation of the head mounted display with respect the weapon based at least partially on first signal;

reconcile the relative positions and orientations;

determines a line of sight of a user based at least partially on the position of the IR emitters mounted on the head mounted display, determines a point of aim of the weapon based at least partially on the position of the IR emitters mounted to the weapon, determines a position of a holographic aiming reticle to be displayed within in the field of view of the head mounted display based on the reconciled relative positions and orientations such that the holographic aiming reticle is positioned in the field of view; and superimposes the holographic aiming reticle in the field of view at the point of aim of the weapon.

9. The optical positioning subsystem of claim 8, wherein during operation of the optical positioning subsystem, the processing unit receives an IR signal from a friendly force and superimposes an identification tag image in the field of view.

10. The optical positioning subsystem of claim 8, wherein during operation of the optical positioning subsystem, the processing unit receives an image from a forward-facing camera mounted to the weapon and superimposes a pop up picture in the field of view.

* * * * *